(12) United States Patent
Gaudenz et al.

(10) Patent No.: US 9,667,162 B2
(45) Date of Patent: May 30, 2017

(54) TRANSFORMER CONNECTION APPARATUS

(71) Applicant: SIEMENS AKTIENGESELLSCHAFT, Munich (DE)

(72) Inventors: Markus Matthias Gaudenz, Erlangen (DE); Thomas Schmitz, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 55 days.

(21) Appl. No.: 14/443,133

(22) PCT Filed: Nov. 19, 2012

(86) PCT No.: PCT/EP2012/072981
§ 371 (c)(1),
(2) Date: May 15, 2015

(87) PCT Pub. No.: WO2014/075740
PCT Pub. Date: May 22, 2014

(65) Prior Publication Data
US 2015/0311813 A1  Oct. 29, 2015

(51) Int. Cl.
*H02M 5/10* (2006.01)
*H02J 3/36* (2006.01)
*H02M 5/42* (2006.01)
*H01F 30/04* (2006.01)
*H02H 9/00* (2006.01)

(52) U.S. Cl.
CPC ............... *H02M 5/10* (2013.01); *H02J 3/36* (2013.01); *H02M 5/42* (2013.01); *H01F 30/04* (2013.01); *H02H 9/002* (2013.01); *Y02E 60/60* (2013.01)

(58) Field of Classification Search
CPC ...... H02M 7/268; H02M 7/7575; H02M 5/10; H02M 5/447; H02M 5/42; H02M 5/45; H02M 5/458; H02M 5/4585; H02M 5/4505; H02J 3/36; H02J 9/062; H01F 30/04; Y02E 60/60
USPC .................. 363/13, 34–40, 48, 49, 108, 109
See application file for complete search history.

(56) References Cited

U.S. PATENT DOCUMENTS 3,473,039 A * 10/1969 Fegley ............... H02H 7/12
                                                307/11
4,133,026 A *  1/1979 Hausler ............. H02J 3/36
                                                363/49
4,308,575 A * 12/1981 Mase ................ H02J 1/02
                                                174/DIG. 17

FOREIGN PATENT DOCUMENTS

DE      617351 C      8/1935
EP     2463978 A1    6/2012

* cited by examiner

*Primary Examiner* — Yemane Mehari
(74) *Attorney, Agent, or Firm* — Laurence Greenberg; Werner Stemer; Ralph Locher

(57) ABSTRACT

An apparatus for connecting a converter to an AC voltage grid has a grid connection for connection to the AC voltage grid and a converter connection for connection to the converter. The grid connection and the converter connection can be connected to one another via two transformers that are connected in parallel with one another and which, in addition to a primary winding and a secondary winding, are equipped with a tertiary winding. At least one switch is connected in series with each transformer. A connection unit is connected to the tertiary windings of each of the transformers and is configured to connect the tertiary windings to one another.

15 Claims, 2 Drawing Sheets

TRANSFORMER CONNECTION APPARATUS

BACKGROUND OF THE INVENTION

Field of the Invention

The invention relates to an apparatus for connecting a converter to an AC grid, which apparatus has a grid connection for connecting to the AC grid and a converter connection for connecting to the converter, wherein the grid connection and the converter connection can be connected to one another via at least two transformers, which are connected in parallel with one another and are equipped with a tertiary winding in addition to a primary winding and a secondary winding, at least one switch being arranged in series with each transformer, and a starter unit being provided, which is connected to a tertiary winding of one of the transformers.

The invention also relates to a high-voltage system and a method for starting a non-magnetized or already pre-magnetized second transformer.

Such an apparatus and such a high-voltage system and such a method are already known in practice in the field of high-voltage DC transmission. FIG. 1 shows schematically a typical known high-voltage DC (HVDC) transmission system 1. The HVDC transmission system 1 shown is used for the transmission of electrical power between a first AC grid 2 and a second AC grid 3. In this system, each AC grid 2, 3 is connected via an apparatus 4 of the type in question to an AC terminal (not shown in the figure) of a converter 5. For power transmission, AC voltage is converted into DC voltage by a converter 5, and transmitted to the other converter 5 via a DC grid 6. The apparatus 4 is used to connect each converter 5 to its associated AC grid 2 and 3 respectively, and comprises two transformers 7, 8 connected in parallel with each other. Each transformer 7, 8 is equipped with a primary winding 9 a secondary winding 10 and a tertiary winding 11. The primary winding 9 is galvanically connected to a grid connection (not shown in the figure), and the secondary winding 10 to a converter connection (also not shown in the figure). The tertiary winding 11 is used for drawing electrical power for internal consumption by the HVDC transmission system 1, so for instance for providing light, heating power, the power supply for control equipment and the like. In principle, one transformer 7, 8 would be sufficient for power transmission between converter 5 and the AC grid. For reliability reasons, however, a second transformer 7, 8 arranged in parallel is provided in order to be able to cover for a failure of the first transformer 7. In normal operation, the energy flows via both parallel-connected transformers 7, 8. When the HVDC transmission system 1 is started up, only the first transformer 7 is connected to the converter 5. This first transformer 7 can therefore be soft-started by slowly increasing the voltages on the AC side of the converter 5 during startup of the HVDC transmission system 1. Particularly when using the HVDC transmission system 1 to connect offshore wind farms, first the primary winding 9 is connected to the AC grid 2, and the secondary winding 10 to the converter 5. Then the voltage produced on the AC side by the converter 5 is increased steadily, with the transformer 7 being slowly magnetized and simultaneously synchronized with the AC voltage of the AC grid 2. The second parallel transformer 8 can likewise already be connected to the converter during this startup process. Also a startup process using just the first transformer 7 is feasible. This is the case, for instance, when maintenance work is being performed on the parallel transformer 8. In FIG. 1, switches (not shown in the figure) are used to isolate the transformers 7, 8.

Starting the second transformer 8 while operation is in progress can interfere with the connected AC grid 2, because in some cases the short-circuit power capacities of these grids are low. This is particularly the case for the already-mentioned connection of offshore windfarms, because the windfarms together with the converter provide only a weak AC grid 2.

When starting the second transformer 8, the currents that flow can be so high that the voltage in a weak AC grid 2 collapses and drops below a permitted total voltage limit. Furthermore, distortions may arise in the AC grid 2 in the form of harmonic components of the fundamental frequency. In addition, overload or damage to the converter from excessive currents cannot be ruled out and is even probable for a weak AC grid such as an island grid, for instance. Even standard solutions in energy technology such as, for example, starting the primary or secondary winding under phase-selective control cannot always ensure that the described interference does not occur in the grid (grid distortions).

In particular, the second transformer must be started when it has previously been switched off for maintenance purposes. For commercial operation, it must be possible to maintain the installation without interrupting the transmission of energy from the system. This is another reason why the system has at least two parallel transformers. The electrical power can then be transmitted via the transformer that is connected in parallel with the switched-off transformer.

It is known in practice to connect the second transformer 8 via a tertiary winding 11 to a diesel generator that can generate a variable voltage level, before starting said second transformer. Hence the diesel generator can be used to magnetize the second transformer 8. Synchronization means are used to synchronize with the AC voltage in the AC grid 2. After being magnetized and synchronized with the AC grid, the second transformer 8 can be soft-started. The known apparatus and known method have the associated disadvantage that the synchronization requires additional components. Furthermore, fuel must be provided for the diesel generator. Particularly on offshore platforms, however, there is a limited supply of fuel. Also refueling such a platform is not trivial. Dispensing with diesel equipment is currently being discussed for future platforms, in particular those in the North Sea.

BRIEF SUMMARY OF THE INVENTION

Therefore the object of the invention is to provide an apparatus, a high-voltage system and a method of the type mentioned in the introduction that are low-cost, simple and reliable.

Proceeding from the apparatus mentioned in the introduction, the invention achieves this object in that the starter unit is also connected to the tertiary winding of the other transformer and is designed to connect the tertiary windings to one another.

The high-voltage system according to the invention comprises a converter, which has a DC terminal and an AC terminal, which AC terminal is connected to an apparatus according to the invention, as described above.

The object is also achieved by a method for starting a non-magnetized second transformer connected in parallel with a magnetized first transformer that is in operation and which is connected to an AC grid and to the AC terminal of a converter, each transformer also comprising in addition to a primary winding and a secondary winding a further winding (tertiary winding). In the method according to the invention, the tertiary winding of the second transformer is connected to the tertiary winding of the first transformer, and only afterwards is the second transformer connected to the AC grid.

The invention is based on the idea that for soft-starting the second transformer, the two tertiary windings of the redundant transformers are coupled to one another in order to magnetize and synchronize the second transformer. Thus according to the invention, a starter unit is provided that can be connected to the two tertiary windings of the parallel-connected transformers. Since the first transformer is already in operation, it provides the energy needed for magnetization and synchronization of the second transformer. The energy is fed into the second transformer via the starter unit. Once the second transformer is sufficiently magnetized and synchronized, it can be connected to the AC grid without high switch-on currents flowing, which could result in distortions in the AC grid or could even cause the protective device of the converter to switch off the converter. Since the tertiary windings of the transformers are present anyway, the apparatus according to the invention and the method according to the invention are low-cost while also being reliable. Of course this is also true of the high-voltage system according to the invention.

The starter unit advantageously comprises a connecting path running between the tertiary windings, in which path is arranged at least one switch. The switch arranged in the connecting path is in its open position in normal operation, during which only one of the parallel transformers is connected to the AC grid and to the converter. Before starting the second transformer, the switch in the connecting path is closed. The tertiary windings of the parallel-connected transformers are thereby galvanically connected to each other. This results in magnetization of the yoke of the second transformer and simultaneously in synchronization with the AC grid, which is already connected to the first transformer. High switch-on currents during starting of the second transformer are avoided because the transformer is already magnetized and synchronized. Moreover, a frequently used tap-changer can further optimize the adjustment of the voltage level. Once the second transformer is connected to the AC grid and to the converter, the connection between the tertiary windings can be disconnected again by opening the switch arranged in the connecting path.

In principle, the switch can be any switch, so also an electronic switch in which power semiconductors are used.

According to a preferred embodiment, however, the switch is a mechanical switch. Mechanical switches are available at low cost commercially and are widely established in the field of high-voltage engineering. If the switch is in the closed position, the inductances, or in other words the impedance of the tertiary windings, ensure that excessive switch-on currents do not flow between the tertiary windings. It has proved advantageous here for the transformation ratio between primary and tertiary winding of the first and second transformers to lie in the region of 10, where the primary winding is connected to the AC grid. For example, the AC grid voltage prevailing in the AC grid lies in the range of 100 to 200 kV, whereas the voltage provided at the terminals of the tertiary winding lies in the range 10 to 20 kV, i.e. in the medium-voltage range. The voltage lying at the AC terminal of the converter lies in the range 100 to 500 kV, for example.

At least one resistor is advantageously arranged in series with the switch. The resistor reduces even further the amplitude of the switch-on currents that arise when the tertiary windings are connected.

The second transformer can be magnetized and synchronized even more softly by this means.

The resistor is advantageously a non-linear resistor. A non-linear resistor, for example, is what is known as a thermistor having a negative temperature coefficient. Thus thermistors have a higher resistance in the received state than in the heated state. Hence the thermistor presents a high resistance when the tertiary windings are connected. The currents arising during magnetization of the second transformer heat the thermistor, however, resulting in a drop in its resistance.

Varistors can be used as a non-linear resistor instead of, or in addition to, thermistors. Varistors block the current flow until the voltage drop across said varistors exceeds a threshold value. Then the varistors behave like an Ohmic resistor.

The starter unit advantageously comprises an inductive element. Inductive elements present an impedance to an AC voltage or an AC current, with the result that the inductive element likewise has a current-limiting effect and hence ensures soft-starting of the second transformer.

According to a development, the starter unit comprises at least one power semiconductor switch. The power semiconductor switch, for example, is the switch already mentioned, which has a three-pole design and is arranged between the tertiary windings. The power semiconductor switch may also be part of a converter, however. The converter can either be arranged in a connecting path that connects the tertiary windings to one another or else connected in parallel with said connecting path. If the converter is connected in parallel with the connecting path, it is advantageously connected to energy storage devices, which are implemented, for example, by what are known as "super caps". The super caps provide the magnetization and synchronization energy needed for soft-starting the transformer. They can likewise be supplied with energy, and hence charged, by the converter via the tertiary winding of the corresponding transformer.

Advantageously, grid switches are arranged between the grid connection and each transformer, and converter switches are arranged between the converter connection and each transformer. If two transformers are provided, a first grid switch is arranged between the first transformer and the grid connection, and a second grid switch between the second transformer and the grid connection. The same applies to the converter switches. Grid switches and converter switches allow disconnection of each transformer from the grid and from the converter respectively.

According to an advantageous development of this arrangement, the starter unit comprises means for phase-selective switching. Phase-selective switching is already known from the prior art so there is no need to provide further details of this here.

According to an advantageous development of the method according to the invention, reactive power is fed into the second transformer via the tertiary winding before starting the second transformer. Such reactive power can be produced by a converter, for example, which is arranged in parallel with a connecting path running between the tertiary windings. This embodiment of the apparatus according to the invention has already been discussed.

The tertiary windings and/or the second transformer are advantageously connected to the AC grid phase-selectively.

The subject matter of the following description of exemplary embodiments of the invention provides further advantageous embodiments and advantages of the invention with reference to the figures in the drawing, in which the same reference signs are given to components that have the same effect, and in which:

DESCRIPTION OF THE INVENTION

Figure 1:
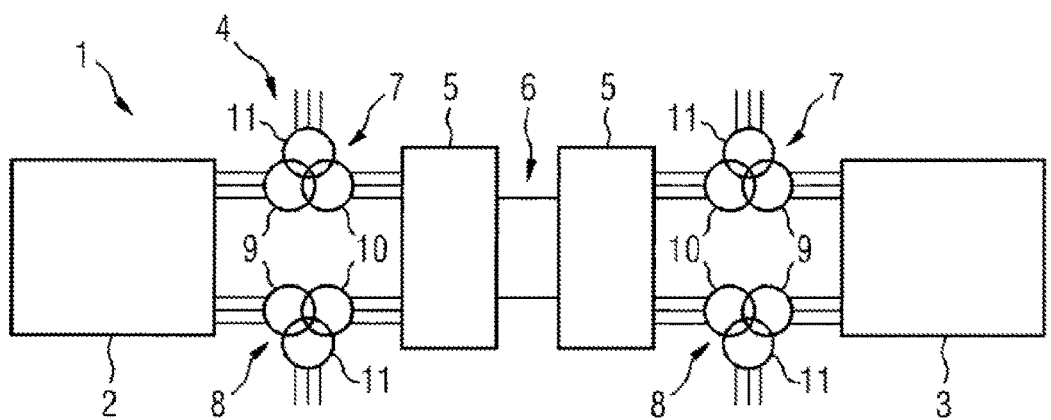
FIG. 1 shows a high-voltage DC transmission system known from the prior art.

FIG. 1 has already been described in detail above and shows a high-voltage DC (HVDC) transmission system known from the prior art.

Figure 2:
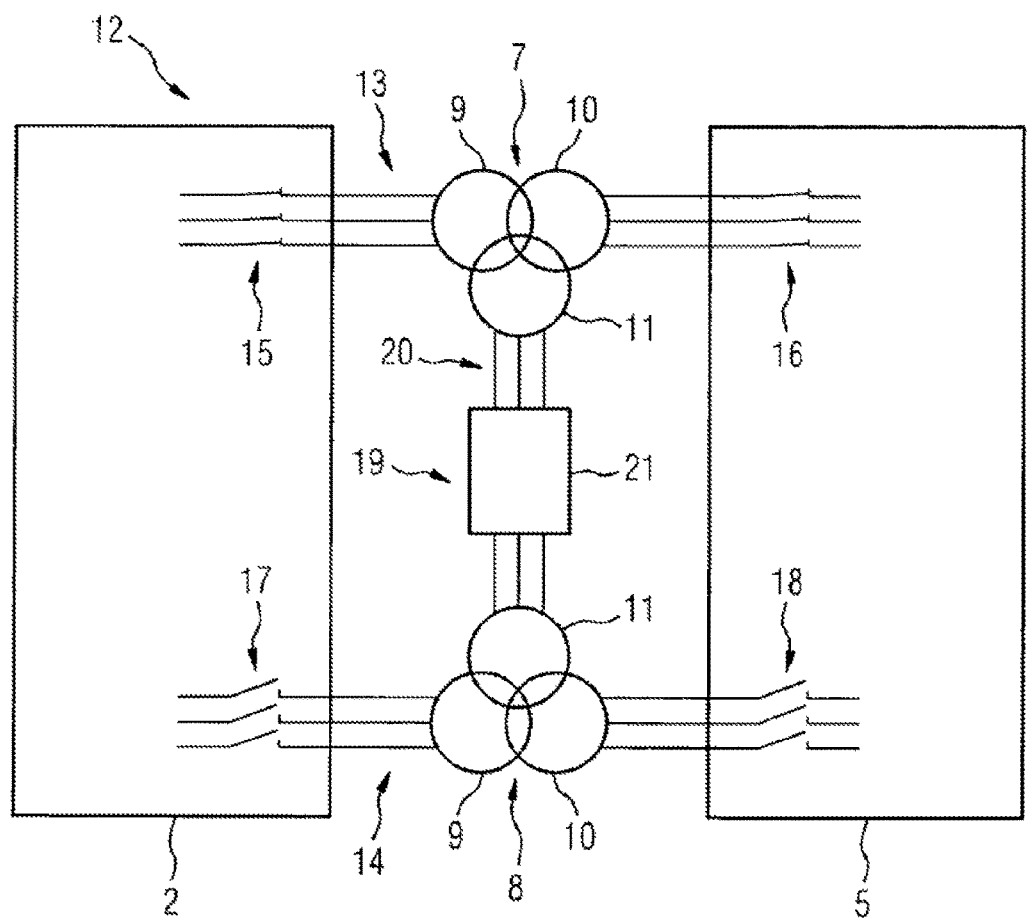
FIG. 2 shows an exemplary embodiment of the apparatus according to the invention.

FIG. 2 shows an exemplary embodiment of the apparatus 12 according to the invention, which is arranged between an AC grid 2 and a converter 5. The apparatus 12 comprises a first transformer 7 and a second transformer 8, each transformer 7, 8 comprising a primary winding 9, a secondary winding 10 and a tertiary winding 11. The first transformer 7 is arranged in a first connecting path 13, and the second transformer 8 in a second connecting path 14. The connecting paths 13 and 14 run in parallel between a grid connection (not shown in the figure) and a converter connection (not shown in the figure) of the apparatus 12. The grid connection can have any design. For instance, it is a simple busbar, which itself is connected to the AC grid 2 again via a switch unit. The grid connection, however, may also be a complex piece of switchgear. In the context of the invention, one or more of these switches may be a starter unit, details of which will be given later.

The same applies to the converter connection. Thus it can be embodied as a simple busbar or also as a complex piece of switchgear containing switches and the like.

A first three-pole grid switch 15 and a first three-pole converter switch 16 are arranged in the first connecting path 13. The first grid switch 15 is arranged between the first transformer 7 and the grid connection, whereas the first converter switch 16 is arranged between the first transformer 7 and the converter connection. The same applies to the second connecting path 14, in which a second grid switch 17 and a second converter switch 18 are arranged. The second grid switch 17 is arranged between the grid connection and the second transformer 8, and the second converter switch 18 is arranged between the second transformer 8 and the converter connection.

The figure shows that the first grid switch 15 and the first converter switch 16 are closed. In other words, the primary winding 9 of the first transformer 7 is connected to the AC grid 2, and its secondary winding 10 is connected to the AC terminal of the converter 5.

A starter unit 19, which comprises a connecting path 20 running between the tertiary windings 11 of the first transformer 7 and the second transformer 8 and comprises additional means 21, is used for soft-starting the second transformer 8. The additional means 21 may be a mechanical or electronic switch, as already mentioned. In addition, Ohmic or nonlinear resistors may be connected in series with said switch. Inductive elements in series with the switch or in series with the Ohmic or nonlinear resistors are also possible as part of the invention.

Now before the second grid switch 17 and the second converter switch 18 are closed in order to bring the second transformer 8 into operation, the tertiary winding 11 of the first transformer 7 is connected to the tertiary winding 11 of the second transformer 8 via the starter unit 19. In the exemplary embodiment shown in FIG. 2, the starter unit 19 comprises in addition to the connecting path 20 a switch and an Ohmic resistor connected in series with said switch. Thus by closing the switch 21, the second transformer 8 is magnetized and simultaneously synchronized with the AC voltage of the AC grid 2. Once the second transformer 8 has been magnetized and synchronized, the second converter switch 18 and then the second grid switch 17 are closed. Depending on the optimization criterion, the grid switch 17 and converter switch 18 can also be closed in the reverse order. The first transformer 7 could be taken out of operation now by opening the switches 15 and 16, for example for maintenance purposes, without having to interrupt the flow of energy.

Figure 3:
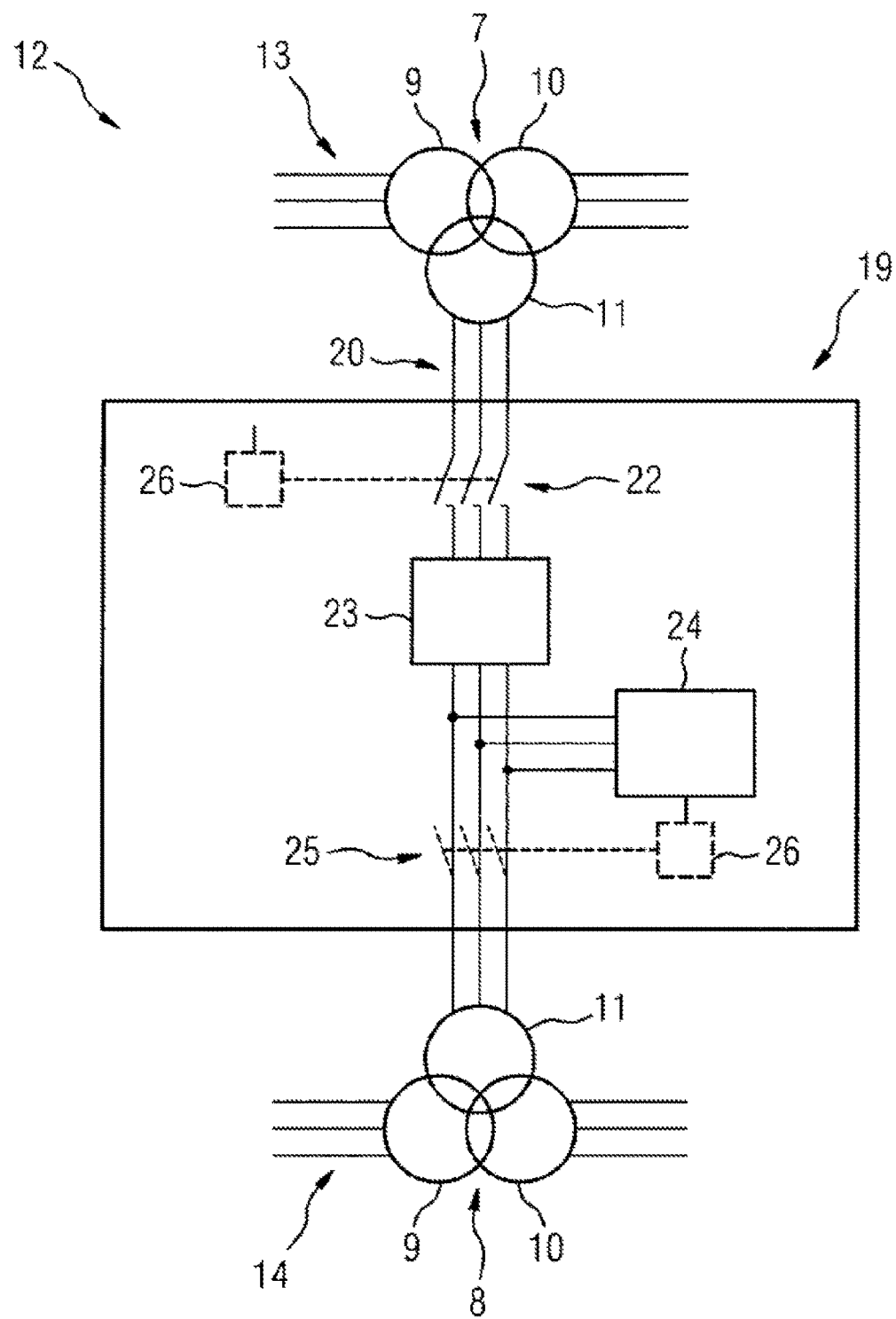
FIG. 3 shows a further exemplary embodiment of the apparatus according to the invention.

FIG. 3 shows a further exemplary embodiment of the apparatus 12 according to the invention, in which a switch 22 of the starter unit 19 is shown in the figure. The switch 22 is arranged in series with an Ohmic resistor 23. The figure shows a converter 24 connected in parallel with the connecting path 20. This converter can be embodied, for example, as a 2-level converter, 3-level converter or even as a multilevel (M2C) converter comprising two-pole submodules connected in series. The converter 24 can be used to supply magnetization energy to the first or second transformer 7, 8. For this purpose, an energy storage device can be connected to the converter in order to reduce voltage fluctuations and to cover losses. The energy storage device is connected in parallel with the DC-link capacitor or, in the case of the multilevel converter, in parallel with the capacitor of the submodules.

In addition, the figure shows optionally a second switch 25 of the starter unit 19, which is arranged between the Ohmic resistor 23 and the tertiary winding 11 of the second transformer 8. The switch 22 and the switch 25 are each connected to means 26 for phase-selective switching, with the result that phase-selective connection of the tertiary windings 11 of the transformers 7 and 8 is possible.

The invention claimed is:

1. An apparatus for connecting a converter to an AC grid, the apparatus comprising:
   a grid connection for connection to the AC grid and a converter connection for connection to the converter;
   two transformers each for individually connecting said grid connection and said converter connection to one another, said two transformers being connected in parallel with one another and each having a primary winding, a secondary winding, and a tertiary winding;
   at least one switch connected in series with each said transformer; and
   a starter unit connected to said tertiary windings of said two transformers and configured to connect said tertiary windings to one another.

2. The apparatus according to claim 1, wherein said starter unit comprises a connecting path running between said tertiary windings, and wherein said switch is disposed in said connecting path.

3. The apparatus according to claim 2, wherein said switch is a mechanical switch.

4. The apparatus according to claim 2, which comprises at least one resistor arranged in series with said switch.

5. The apparatus according to claim 4, wherein said resistor is a nonlinear resistor.

6. The apparatus according to claim 2, wherein said starter unit
comprises means for phase-selective switching.

7. The apparatus according to claim 1, wherein said starter unit comprises an inductive element.

8. The apparatus according to claim 1, wherein said starter unit comprises at least one power semiconductor switch.

9. The apparatus according to claim 8, wherein said starter unit includes a converter and said power semiconductor switch is part of said converter.

10. The apparatus according to claim 9, which comprises energy storage devices connected to said converter, and wherein said converter is connected in parallel with a connection path that connects said tertiary windings.

11. The apparatus according to claim 1, which comprises grid switches connected between said grid connection and each transformer, and converter switches connected between said converter connection and each transformer.

12. A high-voltage system, comprising:
a converter having a DC terminal and an AC terminal; and
an apparatus according to claim 1 connected to said AC terminal.

13. A method for starting a non-magnetized second transformer,
wherein the second transformer is connected in parallel with a magnetized first transformer that is in operation and that is connected to an AC grid and to an AC terminal of a converter, and wherein each transformer has a primary winding, a secondary winding, and a tertiary winding, the method which comprises:
connecting the tertiary winding of the second transformer to the tertiary winding of the first transformer; and
only subsequently connecting the second transformer to the AC grid.

14. The method according to claim 13, which comprises feeding
reactive power into the second transformer via the tertiary winding before starting the second transformer.

15. The method according to claim 13, which comprises connecting the tertiary windings and/or the second transformer to the AC grid phase-selectively.

* * * * *